United States Patent Office 3,248,292
Patented Apr. 26, 1966

3,248,292
PHARMACEUTICALLY ACTIVE DIMETHOXY-
QUINAZOLINES
Joseph L. Minielli and Homer C. Scarborough, Evansville, Ind., assignors to Mead Johnson & Company, Evansville, Ind., a corporation of Indiana
No Drawing. Filed Feb. 6, 1963, Ser. No. 256,524
14 Claims. (Cl. 167—65)

The present invention is concerned with the compounds having Formula I and the pharmaceutically acceptable acid addition salts thereof in therapeutics.

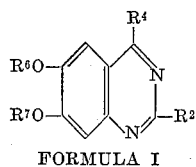

FORMULA I

In this formula $R^2$ and $R^4$ may be hydrogen, alkyl, or alkenyl having up to five carbon atoms. They may be the same or different, but in either event the total of the number of carbon atoms in the two substituents is no greater than six. $R^6$ and $R^7$ may be methyl or ethyl, or together with the oxygen atoms to which they are attached they may constitute the methylenedioxy group.

We have discovered that the compounds of Formula I have physiological activity and as a result, they are useful as pharmaceuticals. We have found that they variously possess pharmacodynamic effects selected from bronchodilator, vasodilator, cardiac stimulant, and anti-inflammatory activity. These substances are characterized by relatively high potencies and relatively low toxicities. Their $LD_{50}$ values on administration intraperitoneally to mice are of the order of 150–300 mg./kg. of body weight, while the pharmacologically effective doses fall in the range of 0.5 to 75 mg./kg. of body weight.

They are effective systemically and may be administered for therapeutic purposes formulated as tablets, capsules, elixirs, solutions, suspensions, etc. Such compositions may contain one of the present compounds as the sole active ingredient or they may be administered with other medicines to provide complementary pharmacological effects. For instance, they may be combined with tranquilizers, sedatives, antibiotics, analgesics, antipyretics, hypnotics, mucolytic agents, and others. Dosages are in the non-toxic range from about 0.5 mg./kg. up to, in unusual circumstances, the toxic limit of the individual compound. Unit doses preferably range from about 50 to 200 mg.

The following substances are preferred for bronchodilator and anti-inflammatory use, since they are effective on oral administration. The bronchodilator potency of these substances generally exceeds that of aminophylline.

4-methyl-6,7-dimethoxyquinazoline
4-isopropyl-6,7-dimethoxyquinazoline
4-ethyl-6,7-dimethoxyquinazoline
6,7-dimethoxyquinazoline
4-(n-propyl)-6,7-dimethoxyquinazoline
2-methyl-4-(n-propyl)-6,7-dimethoxyquinazoline.

4-methyl-6,7-dimethoxyquinazoline is particularly preferred, since it has relatively less cardiac stimulating action and it possesses enhanced pulmonary vasodilator activity. It possesses the capacity in the dog to relieve or prevent morphine spasms of the intestine.

6,7-dimethoxyquinazoline and 2-methyl-6,7-dimethoxyquinazoline have been described in the literature by C. A. Fetscher, et al., J. Org. Chem. 4, 71 (1939) and A. Rilliet, Helv. Chim. Acta. 5, 547 (1922) respectively, but it was not recognized until our discovery that these substances and the other quinazolines of Formula I possess valuable physiologic activity.

SYNTHETIC METHODS 6,7-dimethoxyquinazoline and 2-methyl-6,7-dimethoxyquinazoline are prepared by the methods of Fetscher, et al., and Rilliet referred to above. The remaining substances are prepared by means of the reaction sequence outlined in the following scheme.

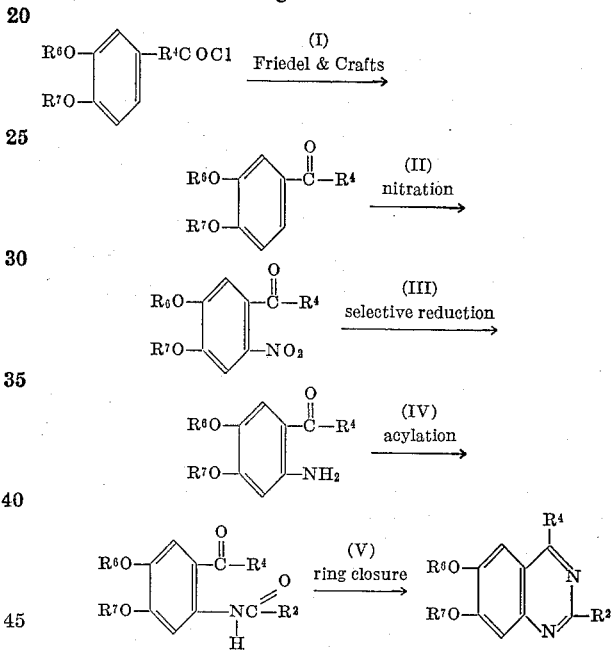

Stage I involve Friedel and Crafts acylation of veratrole, catechol diethyl ether or methylenedioxybenzene with an alkanoyl or alkenoyl chloride having from 1 to 6 carbon atoms, the hydrocarbon residue of which, apart from the carbonyl function, corresponds to the desired $R^4$ substituent. Nitration of the resulting dialkoxyphenone in stage II is carried out with nitric acid, a mixture of concentrated nitric and sulfuric acids, or other suitable aromatic nitration agent. The resulting 6-nitro-3,4-dialkoxyphenone is then selectively reduced in Stage III to the corresponding aminophenone. Reduction is carried out by catalytic or by chemical means. Acylation of the amino group at Stage IV is carried out in conventional fashion. Formic acid or a mixture of formic acid and acetic anhydride desirably serves to introduce N-formyl group of the intermediate from Stage IV when the $R^2$ substituent is hydrogen. The ring closure, Stage V, when $R^2$ is hydrogen is carried out by heating the 3,4-dialkoxy-6-formamidophenone with ammonia in molten ammonium formate.

If an alkyl or alkenyl substituent having 1 to 5 carbon atoms is desired for $R^2$, the 6-aminophenone is acylated in Stage IV with the anhydride or acid halide of an alkanoic or alkenoic acid having 2 to 6 carbon atoms. Stage V ring closure is conducted by heating the acylaminophenone from Stage IV with ammonia in molten ammonium acetate or molten ammoniun salt of the acid corresponding to the acylating agent employed in Stage IV.

When $R^6O$ and $R^7O$ together constitute the methylenedioxy group, 6-aminopiperonal or a corresponding 3,4-methylenedioxy-6-aminophenone is treated as indicated in Stages IV and V.

The following detailed procedures for the preparation of 4-methyl-6,7-dimethoxyquinazoline and 2-methyl-4-isopentyl-6,7-dimethoxyquinazoline are given to illustrate the application of these methods to the preparation of two specific materials defined by Formula I.

*Procedure 1. 3,4-dimethoxy-6-nitroacetophenone.*—A mixture of 350 ml. of nitric acid (sp. gr. 1.42) and 150 ml. of sulfuric acid (sp. gr. 1.84) is cooled to −5° C. and 100 g. (0.56 mole) of powdered 3,4-dimethoxy-acetophenone [J. C. E. Simpson, J. Chem. Soc. 94 (1946)] is added thereto in small portions with stirring and cooling to maintain the temperature at about −5° C. The solution is then stirred for 30 min. and poured into 1 liter of cold water. The product precipitates as a solid which is collected by filtration, washed with water, and recrystallized without drying from ethanol; yield 107 g. (85%), M.P. 133–136° C.

*Procedure 2. 3,4-dimethoxy-6-aminoacetophenone.*—The nitro compound of Procedure 1, 22.5 g. (0.1 mole), 200 ml. of tetrahydrofuran, and 0.1 g. of platinum oxide is agitated in an atmosphere of hydrogen at an initial pressure of 60 p.s.i.g. until three molecular proportions of hydrogen have been absorbed. Approximately 4 hrs. is required. The catalyst is then removed by filtration and the solvent evaporated at reduced pressure. The residue is then recrystallized from diisopropyl ether, yielding the desired product, 46% yield, M.P. 99–102° C.

*Procedure 3. 3,4-dimethoxy-6-formamidoacetophenone.*—A mixture of 40 ml. of formic acid (98–100% pure) and 80 ml. of acetic anhydride is prepared by cautiously mixing the two reagents with cooling. The mixture is then stirred and 0.12 mole of 3,4-dimethoxy-6-aminoacetophenone is added in one portion. The solution is stirred for 10 min. and then diluted with an equal volume of water. This step is carried out with cooling of the reaction vessel with ice water. The suspension of precipitated product is then thoroughly chilled, and the product collected by filtration and recrystallized from ethyl acetate, yield 83%, M.P. 165–167° C.

*Procedure 4. 4-methyl-6,7-dimethoxyquinazoline.*—Ammonium formate, 250 g. and 15.1 g. (0.068 mole) of 3,4-dimethoxy-6-formamidoacetophenone is placed in a 500 ml. three-necked round-bottomed flask equipped with a power stirrer and sintered glass gas addition tube. The flask is heated in an oil bath which is maintained at a temperature of 165–170° C. After the reactants have melted the stirrer is started and a rapid stream of ammonia is passed through the reaction mixture by means of the gas addition tube. After 4 hrs., of treatment in this fashion, the hot solution is then made basic by treatment with ammonium hydroxide and extracted with six 100 ml. portions of chloroform. The combined chloroform extracts are dried over anhydrous magnesium sulfate and the dried solvent removed by evaporation. The residue is recrystallized from acetonitrile and then twice recrystallized from ethyl acetate yielding 5.3 g. of analytically pure product (38% yield), M.P. 150–152° C.

*Procedure 5. 3',4'-dimethoxy-4-methylpentanophenone.*—A soluion of 100 g. (0.72 mole) of veratrole in 500 ml. of methylene chloride is chilled in a reaction flask equipped with stirrer, reflux condenser, and dropping funnel. The reaction mixture is protected from the air by employing a nitrogen atmosphere in the reaction vessel. Aluminum chloride, 107 g. (0.18 mole) is added to this solution in portions. A solution of 100 g. (0.74 mole) of isocaproyl chloride in 100 ml. of methylene chloride is then added in portions during a period of about 30 min. The mixture is refluxed for 1.5 hrs. It is then chilled in an ice bath and the precipitated aluminum salt complex hydrolyzed by the gradual addition of 400 ml. of 15% hydrochloric acid. Sufficient water is then added to dissolve the precipitated aluminum salts and the methylene chloride layer separated. It is thoroughly washed, dried over anhydrous magnesium sulfate, and the solvent distilled. The residual oil is then distilled in vacuo, yielding the desired product as distillate; 129–133° C./0.025 mm. Hg., $n_D^{25}$ 1.5337.

*Procedure 6. 3',4'-dimethoxy-6'-nitro-4-methylpentanophenone.*—The product of Procedure 5, 96 g. (0.41 mole), is added to 1 l. of cooled 69% nitric acid at 10° C. The mixture is then stirred for about 20 min. at room temperature and poured into several liters of water. The product separates from solution and is recovered by extraction with methylene chloride. Removal of the solvent by distillation yields the desired intermediate as a residue which is recrystallized from aqueous ethanol after treatment with decolorizing charcoal, yield 67 g., M.P. 76–79° C.

*Procedure 7. 3',4'-dimethoxy-6'-acetamido-4-methylpentanophenone.*—The nitro compound of Procedure 6, 11.5 g. (0.04 mole), is dissolved in 80 ml. of tetrahydrofuran and reduced with hydrogen at an initial pressure of 60 p.s.i.g. employing 0.1 g. of platinum oxide to supply the catalyst. The calculated quantity of hydrogen is absorbed in about 4 hrs. The product is recovered by filtration of the catalyst and evaporation of the filtrate. The crude amino compound so obtained as a yellow oil is treated with 8 ml. of acetic anhydride resulting in transformation thereof into a solid mass of crystalline material. The solid is dissolved in ethanol with warming and the ethanolic solution allowed to cool with the formation of a yellow crystalline solid. This material is recrystallized from a mixture of water and methanol yielding the product as white crystalline needles, M.P. 97–99° C.

*Procedure 8. 2-methyl-4-isopentyl-6,7-dimethoxyquinazoline.*—3',4'-dimethoxy-6'-acetamido-4-methylpentanophenone, 15.7 g., and 150 g. of ammonium acetate are mixed in a round bottomed flask and heated until liquifaction takes place. An oil bath maintained at 160–165° C. is adequate for this purpose. Ammonia gas is passed into the liquid melt with stirring for a period of 2 hrs. while heating as above. The molten mixture is then poured into 1 liter of water and aqueous mixture treated with sufficient sodium hydroxide to adjust it to an alkaline pH. The precipitated material is then removed by extraction with chloroform and recovered from the extract by evaporation of the solvent. The solid residue so obtained is recrystallized from heptane, yielding light yellow colored needles weighing 7.1 g., M.P. 89.5–90.5° C.

Additional quinazolines of the class defined by Formula I are prepared by application of the above reaction scheme to the appropriate starting materials. Procedures 1–8 modified as necessary with respect to choice of solvents, crystallization or distillation techniques, etc., as will be apparent to those skilled in the art, may be employed. Table I lists suitable starting materials for a number of such preparations. The physical properties for a number of these substances are given in Table II.

TABLE I.—ADAPTATION OF PROCEDURES 1-8 TO ANALOGOUS PREPARATIONS

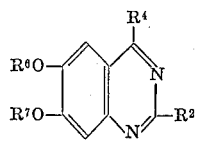

| Entry No. | R² | R⁴ | R⁶ | R⁷ | Starting material |
|---|---|---|---|---|---|
| 1 | CH₃— | (CH₃)₂CHCH₂—CH₂— | C₂H₅— | C₂H₅— | Catechol diethyl ether, isocaproyl chloride, acetic anhydride. |
| 2 | CH₃— | H— | Methylenedioxy | | 6-aminopiperonal, acetic anhydride. |
| 3 | H— | CH₃CH₂CH₃— | CH₃— | CH₃— | Veratrole, butyryl chloride, formic acid-acetic anhydride. |
| 4 | CH₃— | CH₃CH₂CH₂— | CH₃— | CH₃— | Veratrole, butyryl chloride, acetic anhydride. |
| 5 | H— | (CH₃)₂CH— | CH₃— | CH₃— | Veratrole, isobutyryl chloride, formic acid-acetic anhydride. |
| 6 | H— | CH₃)₂CHCH₂—CH₂— | CH₃— | CH₃— | Veratrole, isocaproyl chloride, formic acid-acetic anhydride. |
| 7 | CH₃— | CH₃CH₂— | CH₃— | CH₃— | Veratrole, propionyl chloride, acetic anhydride. |
| 8 | CH₃— | (CH₃)₂CH— | CH₃— | CH₃— | Veratrole, isobutyryl chloride, acetic anhydride. |
| 9 | CH₃CH₂—CH₂— | CH₃CH₂CH₂— | CH₃— | CH₃— | Veratrole, butyryl chloride, butyric anhydride. |
| 10 | H— | CH₃— | C₂H₅— | C₂H₅— | Catechol diethyl ether, acetyl chloride, formic acid-acetic anhydride. |
| 11 | CH₃— | CH₃— | CH₃— | CH₃— | Veratrole, acetyl chloride, acetic anhydride. |
| 12 | CH₃— | CH₃—CH=CH— | CH₃— | CH₃— | Veratrole, crotonoyl chloride, acetic anhydride. |

TABLE II.—PHYSICAL CONSTANTS

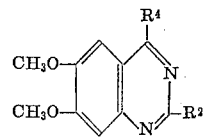

| R² | R⁴ | M.P. (° C.) | Recrystallization solvent | Composition | | | Absorption maxima ultra violet (mµ) [a] | Infra red (µ) [b] |
|---|---|---|---|---|---|---|---|---|
| | | | | C | H | N | | |
| H— | CH₃CH₂CH₂— | 108.5–110.5 | Acetonitrile | 67.37 | 6.93 | 12.33 | 240 (ε 23,100)<br>315 (ε 7,160)<br>327 (ε 8,240) | 6.2, 6.3, 6.4, 6.6, 6.8, 7.0, 7.4, 7.6, 7.8, 7.9, 8.1, 8.3, 8.5, 8.8, 9.1, 10.1, 10.5. |
| CH₃— | (CH₃)₂CHCH₂—CH₂— | 90.5–91.5 | Heptane | 69.73 | 7.98 | 10.19 | 240 (ε 47,000)<br>319 (ε 7,660)<br>330 (ε 8,350) | 6.2, 6.3, 6.4, 6.6, 6.8, 7.0, 7.4, 7.5, 7.7, 7.9, 8.1, 8.3, 8.6, 9.8, 10.4. |
| CH₃— | CH₃CH₂CH₂— | 111–112.5 | Isopropyl ether | 68.17 | 7.49 | 11.41 | 240 (ε 45,000)<br>318 (ε 7,400)<br>330 (ε 8,060) | 6.2, 6.3, 6.4, 6.6, 6.8, 7.0, 7.4, 7.5, 7.6, 7.8, 8.1, 8.3, 8.4, 8.6, 9.8, 10.4. |
| H— | (CH₃)₂CH— | 93–95 | do | 67.00 | 6.93 | 12.18 | 239 (ε 46,000)<br>315 (ε 7,640)<br>325 (ε 3,820) | 6.2, 6.4, 6.6, 7.0, 7.4, 7.8, 8.1, 8.3, 8.4, 8.6, 8.8, 9.1, 9.8, 10.2. |
| H— | (CH₃)₂CHCH₂—CH₂— | 79.5–81.5 | Diisopropyl ether | 69.09 | 7.96 | 10.90 | 221 (ε 2,4200)<br>240 (ε 44,500)<br>315 (ε 7,340)<br>327 (ε 8,590) | 6.2, 6.4, 6.7, 6.8, 7.0, 7.3, 7.7, 8.0, 8.1, 8.3, 8.5, 8.8, 9.2, 9.8, 10.1. |
| CH₃CH₂—CH₂— | CH₃CH₂CH₂ [c] | 157.5–159.5 | Ethyl acetate | | | 8.63 | 240 (ε 45,000) [d]<br>318 (ε 7,220)<br>330 (ε 7,900) | 6.2, 6.3, 6.6, 7.0, 7.3, 7.9, 8.1, 8.5, 9.2, 9.9, 10.1. |
| CH₃— | C₂H₅— | 117–119 | Acetonitrile isopropyl ether. | 67.50 | 6.90 | 12.30 | 240 (ε 41,000)<br>319 (ε 6,910)<br>330 (ε 7,520) | 6.2, 6.4, 6.6, 6.8, 7.1, 7.2, 7.3, 7.5, 7.8, 8.1, 8.3, 8.6, 9.3, 9.8, 10.4, 10.9. |
| H— | CH₃— | 150–152 | Acetonitrile ethyl acetate | 64.91 | 5.65 | 13.83 | 241 (ε 61,600)<br>315 (ε 7,230)<br>327 (ε 8,560) | 6.2, 6.4, 6.7, 6.8, 7.0, 7.4, 7.7, 8.0, 8.1, 8.3, 8.5, 8.9, 9.4, 9.8, 10.1, 10.4. |
| H— | C₂H₅— | 146–148 | Acetonitrile | 65.91 | 6.57 | 13.02 | 222 (ε 23,100)<br>240 (ε 43,000)<br>315 (ε 7,100)<br>327 (ε 8,250) | 6.2, 6.4, 6.6, 7.0, 7.3, 7.4, 7.8, 8.1, 8.2, 8.5, 8.8, 9.3, 9.8, 10.0, 10.4. |

See footnotes at end of table.

TABLE II.—PHYSICAL CONSTANTS—Continued

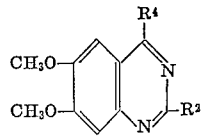

| R² | R⁴ | M.P. (° C.) | Recrystallization solvent | Composition C | Composition H | Composition N | Absorption maxima ultraviolet (mμ) [a] | Infra red (μ) [b] |
|---|---|---|---|---|---|---|---|---|
| CH₃ | CH₃— | 112–114 | ___do___ | 65.81 | 6.30 | 12.93 | 240 (ε 23,100), 319 (ε 3,600), 330 (ε 3,930) | 6.2, 6.4, 6.6, 6.8, 7.1, 7.4, 7.5, 7.7, 8.1, 8.3, 8.6, 9.4, 9.8, 9.9, 10.4. |
| CH₃ | (CH₃)₂CH— | 96.5–98 | Isopropyl ether | 68.25 | 7.28 | 11.31 | 238 (ε 43,700), 317 (ε 7,250), 329 (ε 7,920) | 6.2, 6.4, 6.6, 6.8, 7.0, 7.3, 7.4, 7.5, 7.7, 7.8, 8.1, 8.3, 8.6, 9.1, 9.8, 10.3, 10.6. |

[a] Ethanol used as solvent.
[b] Potassium bromide pellet; 1% concentration of compound.
[c] Hydrochloride salt; Anal. Cl, 11.20.
[d] Measured on 1% solution of hydrochloride salt in 0.1 N ethanolic sodium hydroxide.

BIOLOGICAL ACTIVITY

The bronchodilator activity of the substance with which this invention is concerned is reflected by an in vitro test which involves measurement of the ability of the test compound to relax the tonus of a strip of guinea pig tracheal tissue suspended in a bath of Tyrode's solution. The test employs techniques described by Castillo and De Beer, J. Pharm. & Exptl. Therap. 90, 104 (1947), and by Patterson, J. Allergy 29, 165 (1958). It is described in detail by Lish, et al. in J. Pharm. & Exptl. Therap. 129 (1960). Table III contains a listing of the results obtained with a number of the substances defined by Formula I. Rather than reporting the results in terms of the concentration of compound in the test solution required to exert a specified relaxing effect on the isolated tracheal spiral, a ratio is reported in which the concentration of test compound necessary to cause 75% of the relaxation caused by a supramaximal concentration of papaverine is divided into that concentration of aminophylline which causes the same proportional effect. In effect, these values represent multiples of aminophylline activity.

For secondary evaluation of bronchodilator activity, the histamine aerosol test in guinea pigs is applicable. This test is described by Siegmond, et al. in J. Pharm. & Exptl. Therap. 90, 254 (1947). According to the present application of this test, asthma-like attacks are induced in guinea pigs by subjecting them to an aerosol of 0.5% solution of histamine diphosphate. The parameter measured was the extension of the time period during which the guinea pigs can be exposed to the aerosol before asthma-like attack ensues.

The animals were dosed by either the oral or intraperitoneal routes prior to exposure to the histamine aerosol. Dosage took place 30 minutes prior to exposure when employing the intraperitoneal route and 60 minutes prior to exposure when employing the oral route. Various doses of each test compound were employed, and dose response curves for each drug prepared. From the dose response curve the $ED_{150}$ sec. value was determined by interpolation from the curve. This value represents the dose of test compound required to prolong the predyspneic interval by 150 seconds. The $ED_{150}$ sec. value for aminophylline administered orally was determined to be 175 mg./kg. The results for a variety of compounds with which the present invention is concerned in both the in vitro and in vivo tests are arranged in Table III.

TABLE III.—BRONCHODILATOR ACTIVITY

| R₂ | R₄ | In vitro [a] | Orally [b] | Intraperitoneally [c] |
|---|---|---|---|---|
| H— | n-Pr— | 11.5 | 140 | 53 |
| CH₃— | n-Pr— | 35.3 | 480 | 30.5 |
| H— | i-Pr— | 19.35 | 167 | 22 |
| CH₃— | Et— | 30.0 | 93 | 55 |
| H— | CH₃— | 5.7 | 60 | 28 |
| H— | Et— | 15.8 | 52 | |
| CH₃— | CH₃— | 12.5 | 118 | |
| H— | H— | 11.5 | 98 | |

[a] Multiples of aminophylline activity by the guinea pig tracheal spiral method.
[b] $ED_{150}$ Sec. value in mg./kg. by histamine aerosol method with the guinea pig treated orally.
[c] $ED_{150}$ Sec. value in mg./kg. by histamine aerosol method with the guinea pig treated intraperitoneally.

The anti-inflammatory activity of a number of the substances with which this invention is concerned are compared in Table IV. One test employed for these comparisons involved a measure of the ability of the test compounds to prevent the edema which occurs on plantar injection of the rat foot with formalin. The method is described by Lish in Arch. Int. Pharmacodynamie, Vol. 129, p. 81 (1960).

Groups of 10 rats were treated subcutaneously with the test compound 15 min. prior to plantar injection of 0.1 ml. of a 4% solution of formalin into the right hind foot. The left hind foot of each animal served as a control and was treated with 0.1 ml. of 0.9% saline by plantar injection. One hour later the volume of each hind foot was measured plethysmographically. The edema was expressed as the percent increase in the volume of the formalin injected foot as compared to the saline injected foot. The percent inhibition was then calculated by dividing the mean percent increase of the medicated group by the mean percent increase observed in a non-medicated control group. Several test groups receiving different dosage amounts were run. Dose response curves were prepared and the dose which causes 35% inhibition was determined by interpolation. These values are referred to as $ID_{35}$ values and are arranged in Table IV.

Further tests designed to measure the oral anti-inflammatory effectiveness and the duration of the effect were run. The compounds were administered orally to groups of rats 30 minutes prior to formalin injection as before. Plethysmographic readings of foot volume were taken at 30, 60 and 120 minute intervals after formalin injection. The degree of inhibition at each time interval was calculated and a graph of degree of inhibition vs. time prepared. The area under the curve for each compound was taken as a measure of its activity. The same scale and type of paper was employed in each test and the area calculated by cutting the area from the paper and weighing it. The values obtained are listed in Table IV in the column headed "Activity."

TABLE IV.—ANTI-INFLAMMATORY ACTIVITY

| $R^2$ | $R^4$ | $ID_{35}$ [a] | Oral Treatment [b] | |
|---|---|---|---|---|
| | | | Dose | Activity |
| H— | n-Pr— | 55 | 400 | 473 |
| | | | 100 | 384 |
| CH₃— | n-Pr— | 52 | 400 | 471 |
| | | | 100 | 232 |
| H— | i-Pr— | 27 | 400 | 501 |
| | | | 100 | 286 |
| CH₃— | Et— | 47 | 400 | 30 |
| | | | 100 | 32 |
| H— | CH₃— | 40 | 400 | 645 |
| | | | 200 | 381 |
| | | | 100 | 231 |
| H— | Et— | 30 | 400 | 621 |
| | | | 100 | 218 |
| CH₃— | CH₃— | 48 | 200 | 305 |
| | | | 100 | 85 |
| H— | H— | 60 | 400 | 616 |
| | | | 100 | 151 |
| Aspirin | | 590 | 800 | 151 |
| | | | 400 | 102 |
| | | | 200 | 94 |

[a] Dose causing 35% inhibition of formalin inducted edema in the rat paw, subcutaneous administration of test compound; determined from dose response curve.
[b] Inhibition of formalin induced edema in the rat paw; paw volumes measured 30, 60 and 120 minutes following formalin injection; activity values are proportional to the area under the curve of time vs. percent inhibition, expressed as mg.

*Procedure 9. Capsules containing 4-methyl-6,7-dimethoxyquinazoline.*—A dry blend of the following ingredients is prepared:

| | Kg. |
|---|---|
| 4-methyl-6,7-dimethoxyquinazoline | 10.0 |
| Lactose | 14.8 |
| Magnesium stearate | 0.2 |
| Total | 25.0 |

This mixture is then used to fill No. 2 hard gelatin capsules, each with 250 mg. of blend to provide capsules containing 100 mg. each of the active ingredient.

*Procedure 10. Capsules containing 4-ethyl-6,7-dimethoxyquinazoline.*—A dry blend of the following ingredients is prepared:

| | Kg. |
|---|---|
| 4-ethyl-6,7-dimethoxyquinazoline | 5.0 |
| Lactose | 19.8 |
| Magnesium stearate | 0.2 |
| Total | 25.0 |

This mixture is then employed to fill No. 2 hard gelatin capsules, each with 250 mg. of the blend containing 50 mg. of the active ingredient.

*Procedure 11. Capsules containing 4-isopropyl-6,7-dimethoxyquinazoline.*—The preparation described in procedure 9 is repeated substituting an equal weight of 4-isopropyl-6,7-dimethoxyquinazoline for the 4-methyl-6,7-dimethoxyquinazoline stated in that example.

*Procedure 12. 2,4-Di-(n-propyl)-6,7-dimethoxyquinazoline hydrochloride.*—2,4-di-(n-propyl)-6,7-dimethoxyquinazoline, 0.4 mole, is dissolved in absolute ethanol and treated with 12 ml. of 3.4 N ethanolic hydrogen chloride with thorough mixing. Crystallization of the hydrochloride salt is promoted by the addition of diethyl ether to the solution. The product is collected on a filter and crystallized from ethyl acetate. Its physical properties are reported in Table II.

Other pharmaceutically acceptable acid addition salts are made in analagous fashion with appropriate selection of reaction and crystallization solvents. The pharmaceutically acceptable acid addition salts include the hydrochloride, hydrobromide, acetate, propionate, phosphate, nitrate, succinate, gluconate, mucate, sulfate, methanesulfonate, ethanesulfonate, p-toluenesulfonate, citrate, tartrate, benzoate, pamoate, and tannate salts.

While several particular embodiments of this invention are shown above, it will be understood that the invention is not to be limited thereto, since many modifications may be made, and it is contemplated, therefore, by the appended claims to cover any such modifications as fall within the true spirit and scope of this invention.

What is claimed is:

1. A process of exerting in a mammalian host at least one pharmacodynamic effect selected from among bronchodilator, vasodilator, cardiac stimulant and anti-inflammatory effects which comprises administering to said host a pharmaceutically effective non-toxic dose of a compound selected from the group consisting of (a) substances having Formula I

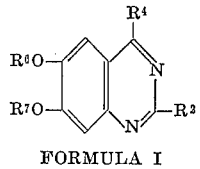

FORMULA I wherein $R^2$ and $R^4$ together contain up to 6 carbon atoms and are selected from the group consisting of hydrogen, alkyl, and alkenyl having up to 5 carbon atoms, and $R^6$ and $R^7$ are selected from the group consisting of methyl and ethyl, (b) substances of Formula I wherein $R^2$ and $R^4$ have the same meaning as in (a) and $R^6O$ and $R^7O$ together form the methylenedioxy group, and (c) the pharmaceutically acceptable acid addition salts of (a) and (b).

2. The process of claim 1 where said dose is in excess of 0.5 mg./kg. of body weight of said host.

3. The process of claim 1 wherein said dose is in the range of 0.5 to 75 mg./kg. of body weight of said host.

4. The process of claim 1 wherein a non-toxic dose of 4-methyl-6,7-dimethoxyquinazoline is employed.

5. The process of claim 1 wherein a non-toxic dose of 4-isopropyl-6,7-dimethoxyquinazoline is employed.

6. The process of claim 1 wherein a non-toxic dose of 4-ethyl-6,7-dimethoxyquinazoline is employed.

7. The process of claim 1 wherein a non-toxic dose of 6,7-dimethoxyquinazoline is employed.

8. The process of claim 1 wherein a non-toxic dose of 4-(n-propyl)-6,7-dimethoxyquinazoline is employed.

9. The process of claim 1 wherein a non-toxic dose of 2-methyl-4-(isopropyl)-6,7-dimethoxyquinazoline is employed.

10. The process of claim 1 wherein a non-toxic dose of 2-methyl-4-(isopentyl)-6,7-dimethoxyquinazoline is employed.

11. A pharmaceutical composition in dosage unit form comprising a pharmaceutical carrier and a non-toxic dose containing from 50 milligrams to 200 milligrams of a compound selected from the group consisting of (a) substances having Formula I

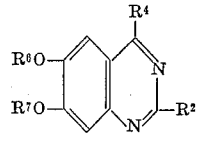

Formula I wherein $R^2$ and $R^4$ together contain up to 6 carbon atoms and are selected from the group consisting of hydrogen, alkyl, and alkenyl having up to 5 carbon atoms, and $R^6$ and $R^7$ are selected from the group consisting of methyl and ethyl, (b) substances of Formula I wherein $R^2$ and $R^4$ have the same meaning as in (a) and $R^6O$ and $R^7O$ together form the methylenedioxy group, and (c) the pharmaceutically acceptable acid addition salts of (a) and (b).

12. A pharmaceutical composition as claimed in claim 11 wherein said compound is 4-methyl-6,7-dimethoxyquinazoline.

13. A pharmaceutical composition as claimed in claim 11 wherein said compound is 4-isopropyl-6,7-dimethoxyquinazoline.

14. A pharmaceutical composition as claimed in claim 11 wherein said compound is 4-ethyl-6,7-dimethoxyquinazoline.

References Cited by the Examiner

Chem. Abst., Vol. 13, p. 2531 (4), 1919.
Chem. Abst., Vol. 16, p. 3886 (2) 1922.
Chem. Abst., Vol. 33, p. 4253 (5), 1939.

JULIAN S. LEVITT, *Primary Examiner.*

FRANK CACCIAPAGLIA, JR., LEWIS GOTTS,
*Examiners.*